(12) United States Patent
Havar et al.

(10) Patent No.: US 9,623,619 B2
(45) Date of Patent: Apr. 18, 2017

(54) CONNECTION ARRANGEMENT FOR CONNECTING TWO PROFILED ELEMENTS IN AN AERODYNAMICALLY SMOOTH MANNER, METHOD FOR PRODUCING SAID CONNECTION ARRANGEMENT, AND DEVICE FOR CARRYING OUT THE METHOD

(75) Inventors: Tamas Havar, Bruckmühl (DE); Matthias Geistbeck, Mindelheim (DE); Meinhard Meyer, München (DE); Oliver Rohr, Ottobrunn (DE); Thomas Meer, Egmating (DE)

(73) Assignee: Airbus Defence and Space GmbH, Ottobrunn (DE)

(*) Notice: Subject to any disclaimer, the term of this patent is extended or adjusted under 35 U.S.C. 154(b) by 693 days.

(21) Appl. No.: 14/129,494

(22) PCT Filed: May 29, 2012

(86) PCT No.: PCT/DE2012/000553
§ 371 (c)(1),
(2), (4) Date: Mar. 6, 2014

(87) PCT Pub. No.: WO2013/000447
PCT Pub. Date: Jan. 3, 2013

(65) Prior Publication Data
US 2014/0209232 A1    Jul. 31, 2014

(30) Foreign Application Priority Data

Jun. 30, 2011  (DE) .................. 10 2011 107 624

(51) Int. Cl.
*B64C 1/12* (2006.01)
*B29D 99/00* (2010.01)

(52) U.S. Cl.
CPC .............. *B29D 99/001* (2013.01); *B64C 1/12* (2013.01)

(58) Field of Classification Search
CPC .................................................. B29D 99/0021
See application file for complete search history.

(56) References Cited

U.S. PATENT DOCUMENTS 4,507,011 A    3/1985  Brown
4,888,451 A   12/1989  Toni et al.
(Continued)

FOREIGN PATENT DOCUMENTS

DE    4019744 A1    1/1992
DE   68907396 T2   10/1993
(Continued)

OTHER PUBLICATIONS

English translation of the International Preliminary Report on Patentability issued in PCT/DE2012/000553 on Jan. 16, 2014.
(Continued)

*Primary Examiner* — Ryan Ochylski
(74) *Attorney, Agent, or Firm* — Hoffmann & Baron, LLP

(57) ABSTRACT

The invention relates to a connection arrangement for connecting two profiled elements in a seamless and aerodynamically smooth manner in order to form a profiled surface around which a laminar flow is possible. A first profiled element has a first fixing strip that extends towards the second profiled element, and the surface of the first fixing strip is lower than the surfaces of the profiled elements in the outward direction. Furthermore, the second profiled element has a second fixing strip which is molded on the inside and which is arranged below the first fixing strip, and the two profiled elements are rigidly connected to each other by means of the second fixing strip. A filler region that can be found below the connecting surface between the profiled (Continued)

surfaces and above the fixing strip surface is tilled with at least two layers of cured filling material. A method for filling the filling region with filling material and a device for carrying out the method are also claimed.

11 Claims, 3 Drawing Sheets

(56) References Cited

U.S. PATENT DOCUMENTS

| | | | |
|---|---|---|---|
| 8,898,901 B2* | 12/2014 | Richter ............... | B29C 65/5014 156/192 |
| 2010/0143145 A1* | 6/2010 | Jones ................. | B29C 63/0021 416/230 |

FOREIGN PATENT DOCUMENTS

| | | |
|---|---|---|
| DE | 202004001671 U1 | 5/2004 |
| EP | 0930126 A1 | 7/1999 |
| EP | 1561387 A2 | 8/2005 |
| EP | 2368699 A1 | 9/2011 |
| WO | WO 2009/118548 A2 | 10/2009 |

OTHER PUBLICATIONS

International Search Report issued in PCT/DE2012/000553 on Nov. 12, 2012.

* cited by examiner

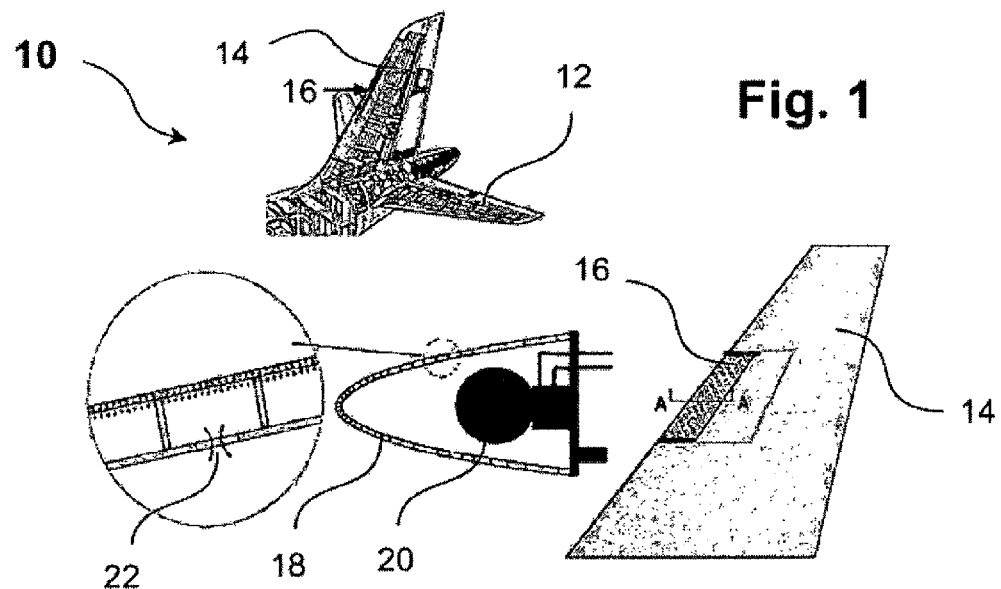
Fig. 1
Fig. 2
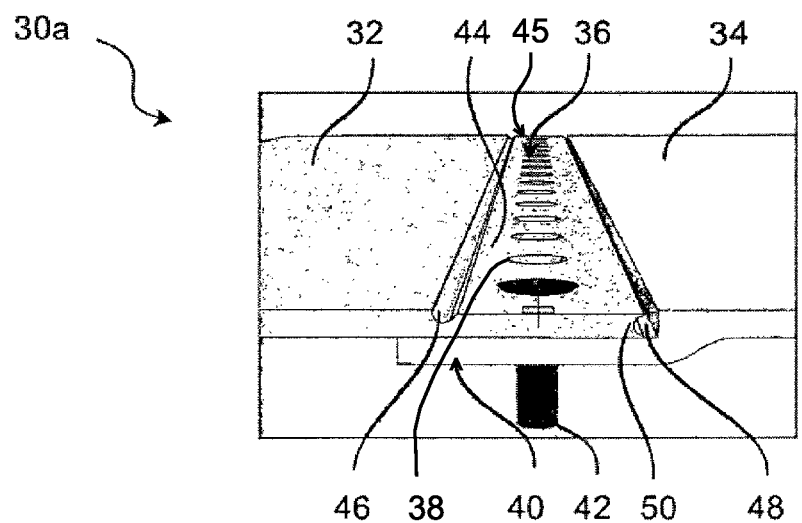
Fig. 3

CONNECTION ARRANGEMENT FOR CONNECTING TWO PROFILED ELEMENTS IN AN AERODYNAMICALLY SMOOTH MANNER, METHOD FOR PRODUCING SAID CONNECTION ARRANGEMENT, AND DEVICE FOR CARRYING OUT THE METHOD

CROSS-REFERENCE TO RELATED APPLICATIONS

This application is a U.S. National Phase of International Application No. PCT/DE2012/000553 filed 29 May 2012, which claims benefit of German Patent Application No. 10 2011 107 624.0 filed 30 Jun. 2011, the contents of which are incorporated herein by reference in their entirety.

BACKGROUND

The invention relates to a connection arrangement for connecting two profiled elements in a seamless and aerodynamically smooth manner in order to form a profiled surface around which a laminar flow is possible, to a method for producing the connection arrangement, and to a device for carrying out the method.

The joining methods used today in aircraft construction usually consist of bolt connections with tolerances of approximately 0.1 mm. This is not a problem because the manufacturing tolerances for components made of carbon fiber reinforced plastic and metal are usually above this value. Thus, conventional connection designs, for example, of noses on aircraft wings, have tolerances of more than 0.3 mm, which are sufficient for aerodynamic profiles with turbulent flow.

However, there is an increasing tendency in aircraft development to reduce fuel consumption. For this purpose, it would be desirable to lengthen the region of laminar flow on profiled surfaces in the flow direction, which can be done, for example, by suctioning a boundary layer. For profiled surfaces around which there is a laminar flow these tolerances are too high by approximately one order of magnitude. For example, if a titanium nose with an incorporated pump for boundary layer suctioning is attached to a wing profiled section made of carbon or glass fiber reinforced plastic, then the transition from the titanium nose to the plastic box has to be configured to be extremely gentle, and it has to have tolerances of less than 0.05 mm. This is not achievable with the currently available manufacturing and production possibilities.

SUMMARY

The problem of the invention is to provide a connection arrangement, a method for producing same, and a device for carrying out the method, which complies with the small tolerances in the range of less than 0.05 mm required for laminar flow, and which can be implemented in an automated manner.

This problem is solved by the features of the independent claims. Advantageous variants and embodiments are the subject matter of the dependent claims.

In particular, according to the invention, a connection arrangement is proposed for connecting two profiled elements in a seamless and aerodynamically smooth manner to form a profiled surface which has an outer face and an inner face, wherein a first profiled element has a first fixing strip with a number of first bore holes with fixing bolts, which extends towards the second profiled element, and the surface of the first fixing strip is lower than the surfaces of the profiled elements in the outward direction; furthermore, the second profiled element has a second fixing strip with second bore holes aligned with the first bore holes for receiving the fixing bolts, which is molded on the inside and which is arranged below the first fixing strip, as a result of which the two profiled elements are rigidly connected to each other, and a filler region located beneath the connecting surface between the profiled surfaces and above the fixing strip surface is filled with at least two layers of cured filling material.

Furthermore, the invention proposes a method for forming the connection arrangement, in which, in a first filling step, the filler region is partially filled with a first filling material layer, and the surface of the filling material is smoothed using a removal scraper moved in the longitudinal direction of the connection, and then the first filling material layer is cured, and, in a second filling step, a second filling material layer is introduced in order to completely fill up the filler region, and the surface of the second filling material layer is smoothed in a shaping manner, and then said layer is cured. It should be noted here that the application of the filling material can also take place in more than two steps, although this reduces the economic efficiency.

As a result, it is possible to use today's manufacturing and production methods for the installation and smoothing of discontinuities of components that are connected to one another for forming aerodynamic airfoils around which a laminar flow can occur. Here, a high degree of automation is possible, which allows the production of cost effective, aerodynamically high-quality joints.

As filling material it is preferable to use a material having a shrinkage of less than 5%, in order to prevent excessive collapse of the filling material. Furthermore, the filling material should have a sufficiently high adhesive strength, in particular on metal (titanium) of more than 20 MPa. The filling material preferably should have a quality ranging from Gt0 to Gt2 according to the so-called cross-cut test of the cured filling composition surface after removal from wet storage and also after 1000 temperature cycles between −55° C. and 120° C. Suitable filling materials are, for example, Seevenax from the Mankiewicz company, Loctite 3336, DP490 or DP190 from the 3M company.

According to an advantageous variant of the invention, one of the profiled elements is made of plastic, and the other of metal. As plastic for one of the profiled elements, it is preferable to use carbon or glass fiber reinforced plastic. Naturally it is also possible within the scope of the invention to manufacture the two profiled elements from plastic or metal.

According to another advantageous variant of the invention, the connecting surface between the profiled surfaces has a step having the height of the thickness of one paint layer applied to the plastic profiled element, preferably approximately 0.04-0.08 mm. Thus, even if the plastic region is painted, a sufficiently smooth surface transition to an uncoated metal part can be achieved.

According to another advantageous variant of the invention, the transition from the first and/or second profiled element to the associated fixing strip has an undercut region. This allows advantageously a nondetachable fastening of the hardened filling material in the filler region, particularly if undercuts are provided on both sides of the filler region.

According to another advantageous variant of the invention, before the first filling step, the surfaces are subjected to preliminary treatment by laser cleaning. This method allows a local cleaning and roughening of the surface and it does not generate any soiling, as during polishing, or chemicals as during etching. Therefore, it is particularly suitable for automated procedures to be carried out in assembly hangars.

According to another advantageous variant of the invention, the first filling material layer is subjected to a preliminary treatment by laser cleaning before the application of the second filling material layer. The same advantages as described in the previous paragraph are achieved, and if the two steps are carried out using the same process, simplifications of the process technology are achieved.

According to another advantageous variant of the invention, the shaping smoothing of the second filling material layer occurs using a removal scraper moved in the longitudinal direction of the connection (that is transversely to the direction of airflow). The term "longitudinal direction of the connection" in this context refers to the direction along which a connection of the two profiled elements is made, i.e., perpendicularly to the direction of the subsequent flow of air.

According to another advantageous variant of the invention, the shaping smoothing of the second filling material layer occurs using a separating film applied temporarily onto the second filling material layer, and using at least one pressure roller rolling in the longitudinal direction of the connection over the separating film. This process step allows a high-precision, automated procedure to be carried out. After the completion of the process, that is after the curing of the second filling material layer, the separating film is pulled off.

According to another advantageous variant of the invention, a device is proposed for carrying out the above-described method, which includes at least two pressure rollers as well as a circulating belt running around the pressure rollers, and which is movable in an automated manner in the longitudinal direction of the connection. Such a device can be moved automatically, in particular using a robot or corresponding controls and it allows therefore an economically highly efficient degree of automation of the assembly.

According to another advantageous variant of this device, for curing the second filling material, at least one heating block is used between the two pressure rollers, which is pretensioned against the circulating belt and thus also against the surface of the filling material. Such a device is of simple design and, in the case of surface smoothing, it allows simultaneously curing using heat. It is also possible for two such devices to be moved one after the other along the connection arrangement: a first one without heating block, for shaping, and a second one with heating block, primarily for curing.

According to another advantageous variant of this device, several heating blocks arranged one after the other are provided, which are preferably individually pretensioned. In this manner, the hardening and smoothing process can be controlled even more precisely.

According to another advantageous variant of this device, in addition to the at least two pressure rollers, two compensation rollers which can be put in contact with the connection arrangement are provided, the latter rollers being shaped complementary to the shape of the pressure rollers, so that the circulating belt is evenly stretched over the width.

According to another advantageous variant of this device, the device includes at least one filling device for introducing filling material into the filler region. In this manner, the filling process of the filling material of the second filling material layer can be simplified.

According to another advantageous variant of the invention, this device together with a second similar device is held in a common holder, wherein the two devices can be pressed against each other in the common holder, and a bilateral processing of two connection arrangements located on opposite sides of the profiled surface is made possible. In this manner, the assembly process can be simplified further, wherein, owing to the simultaneous application of the compression forces from the two sides onto the profile, the effort needed for the fastening thereof is reduced.

SUMMARY OF THE DRAWINGS

Additional advantages, features and details result from the following description in which—in reference to the drawing—at least one embodiment example is described in detail. Described and/or illustrated features, individually or in any reasonable combination, constitute the subject matter of the invention, including possibly independently of the claims, and, in particular, they can also be additionally the subject matter of a separate application or of several separate applications. Similar, identical, and/or functionally equivalent parts are provided with the same reference numerals.

FIG. 1 shows a perspective view of the application of the connection arrangement according to the invention;

FIG. 2 shows a representation of an aircraft vertical tail with nose region;

FIG. 3 shows a perspective representation of a connection arrangement without filling material;

DETAILED DESCRIPTION

Figure 4:
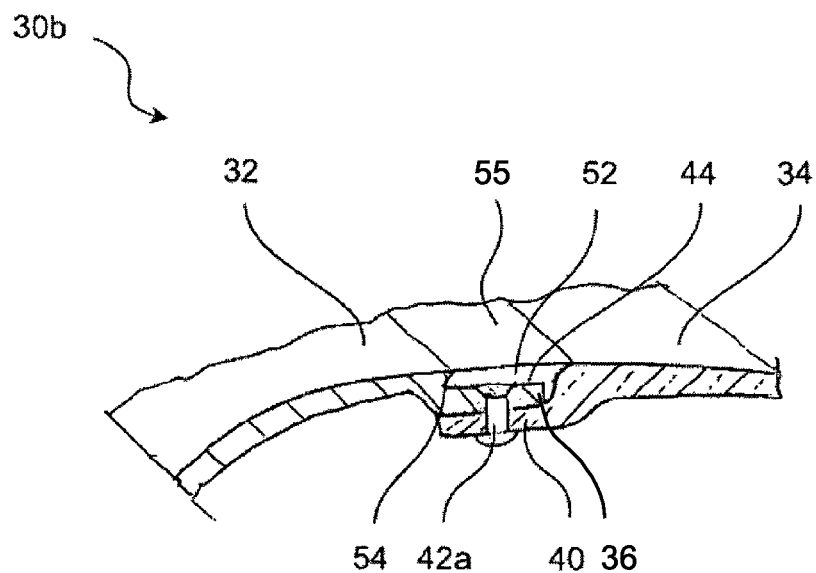
FIG. 4 shows a perspective representation of a connection arrangement with filling material.

In FIG. 1, the stern section 10 of an aircraft is represented diagrammatically with horizontal stabilizer 12 and a vertical stabilizer 14. Reference numeral 16 designates the front edge region of the vertical stabilizer 14, in which a laminar flow exists at first, which, however, becomes turbulent flow after a relatively short distance. In order to lengthen the region of laminar flow—as represented in FIG. 2—in the front portion of the vertical stabilizer 14, a cap or nose 18 is arranged, in the interior of which at least one suction pump 20 is attached, and using which air is suctioned from the turbulent boundary layer, via suction holes 22 arranged in the outer skin of the nose 18, and thus the region of laminar flow is increased, as a result of which the frictional resistance decreases and thus less fuel is consumed. To be able to use this effect optimally, it is important to configure the transition from the nose 18 to the normal structure of the vertical stabilizer 14 with very low tolerances, that is, as smoothly as possible, or else vortices develop at this site and thus a transition to turbulent flow. However, the connection arrangement according to the invention can also be used in the same manner in the case of the horizontal stabilizer 12 or airfoil wings that are not represented.

In FIG. 3, a perspective representation of a connection arrangement 30a is represented, in which a first profiled surface 32 is to be connected to a second profiled surface 34. It is preferable for the first profiled surface 32 to be made of titanium and the second profiled surface 34 to me made of CFRP. The first profiled surface 32 has a molded first fixing strip 36 extending in the direction of the second profiled surface 34, and including several bore holes 38. On the second profiled surface 34, a second fixing strip 40 is molded in a similar manner, which also includes bore holes—not shown—which are aligned with the bore holes 38 of the first fixing strip 36 for the mounting of bolts 42 (rivets or screws) for the attachment of the two profiled surfaces 32, 34 to each other. Thus, for example, the nose 18 of the vertical stabilizer 14 shown in FIGS. 1 and 2 can be formed.

The surface 44 of the first fixing strip 36 faces the surfaces of the two profiled surfaces 32, 34 and is lower by a certain depth, for example, 0.2 to 0.5 mm, as a result of which a filler region 45 filled with filling material is defined above the fixing strip surface 44 up to the connecting surface of the two profiled surfaces 32, 34. Furthermore, in the transition from the first profiled surface 32 to the associated fixing strip 36, a groove 46 is arranged, which is used to promote a better connection of the filling material to the structure. The first fixing strip 36 has an extent such that a gap 48 is left with respect to the second profiled strip 34 or the second fixing strip 40. Furthermore, the front surface of the first fixing strip 36 has a groove 50, which represents an undercut, and which makes possible a reservoir for receiving excess filling material as well as the fastening of the cured filling material, which additionally contributes to the adhesion on the surface 44.

In FIG. 4, a perspective representation of a finished connection arrangement 30b is represented, in which fixing strips 36, 40 are secured by bolts 42a (rivets or screws), and which is filled with filling material 52. Here, the thickness of the filling material 52 over the surface 44 is represented exaggeratedly thick. Parts equivalent to those in FIG. 2 are provided with the same reference numerals. In this arrangement, an undercut 54 is present, which also contributes to fastening the filling material 52. On the outside, a flat and high-grade smooth connecting surface 55 is formed between the surfaces of the profiled strips 32 and 34.

Figure 5:
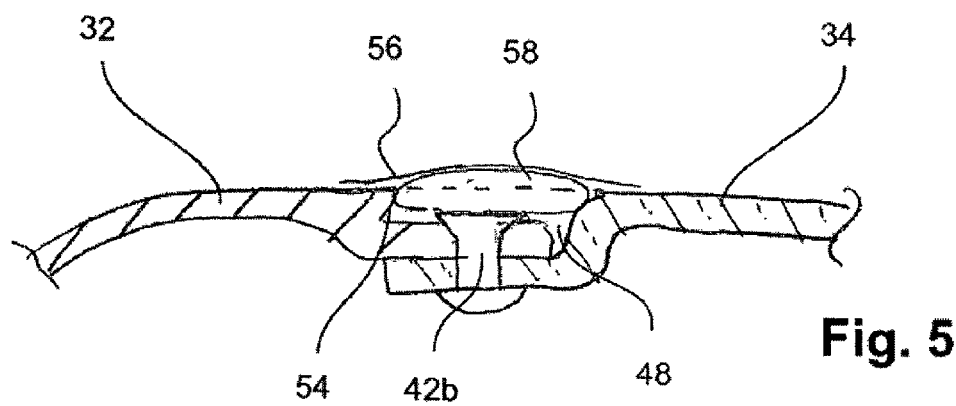
FIG. 5 shows a diagrammatic representation of a cross section through a filling step with filling material.

In FIG. 5, in a diagrammatic cross section, a method is represented for filling the first filling material layer using a separating film 56. Identical reference numerals designate identical components to those in the other figures. Here, in this embodiment, countersunk head bolts 42b are used, whose bolt heads protrude above the surface 44 and thus form mushroom head-like projections which are enclosed by the filling material 58, which also provides a fastening for the cured filling material. The filling material 58 is injected into the filler region 45 and it protrudes possibly at first over the later contour, thus forming a bead, while at the same time not all the cavities are filled yet, and in particular the groove 48 is not yet filled. Subsequently, a separating film 56 is placed over the filling material 58, and thereafter with the removal scraper the final contour is stamped, wherein the filling material 58 is pressed under the undercut 54, beneath the countersunk head bolt 42b and into the groove 48. Here, the surface of the resulting first filling material layer remains beneath the connecting surface 55—preferably approximately one-dimensionally curved—indicated with a broken line—between the surfaces of the profiled surfaces 32, 34. Subsequently, preferably of using heat, a curing of the filling material 58 occurs. Subsequently, in a second largely identical step, the second filling material layer is applied to the lower layer, and said second filling material then forms the final outer contour.

Figure 6:
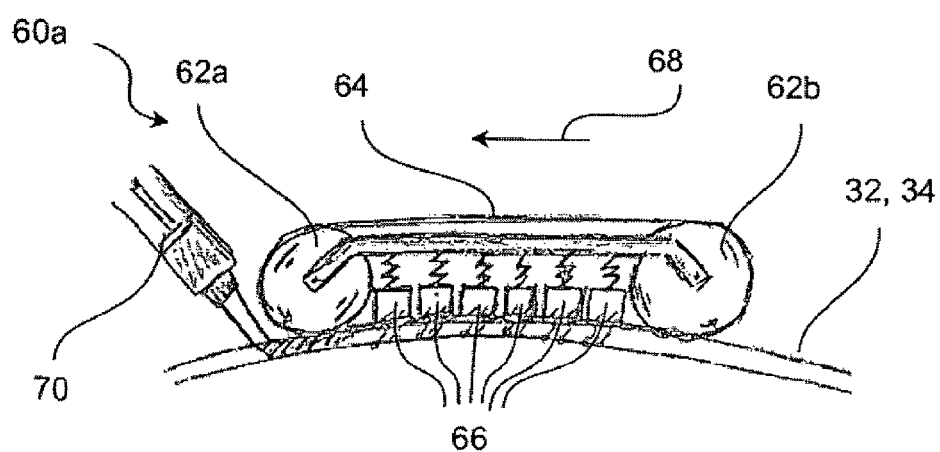
FIG. 6 shows a first embodiment of a device for carrying out the method for producing the connection arrangement.

In FIG. 6, a first embodiment of a device 60a for carrying out the described method is represented, which consists substantially of two pressure rollers 62a, 62b and a circulating belt 64, which is guided around the two pressure rollers 62a, 62b. In the region between the pressure rollers 62a, 62b, several heating blocks 66 are located, which are pressed individually using springs against the circulating belt 64 or the profiled surfaces 32, 34 arranged beneath during the production process. During operation, the device 60a moves in the direction marked with the arrow 68. In front of the device 60a, using an injection device 70, which can also be attached to the device 60a, the filling material is pressed into the filler region 45 between the profiled surfaces 32, 34.

Figure 7:
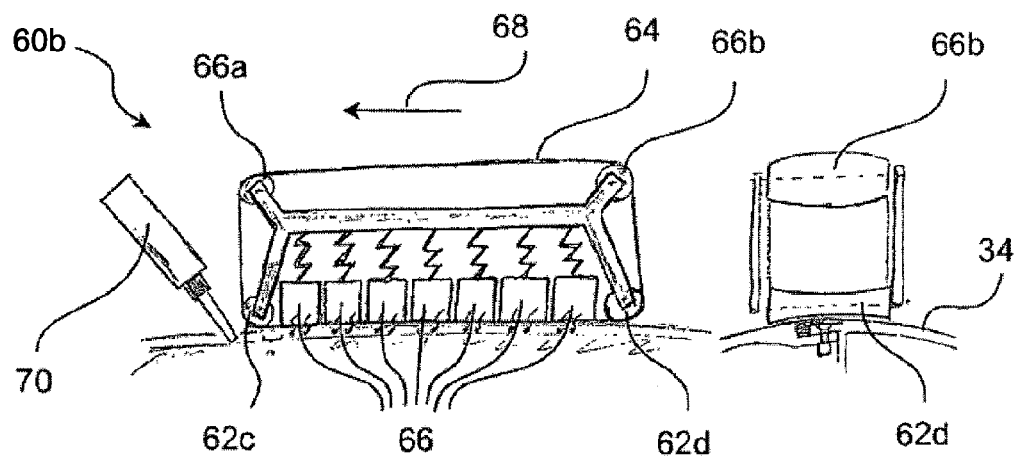
FIG. 7 shows a second embodiment of a device for carrying out the method for producing the connection arrangement.

In FIG. 7, a second embodiment of a device 60b for carrying out the above-described method is represented in two views, in which identical reference numerals designate identical parts to those in FIG. 6. In contrast to the embodiment according to FIG. 6, the device 60b includes two pressure rollers 62c, 62d, which are not cylindrical in shape but rather are in the shape of a hyperboloid, that is they are thinner in the middle region, so that the typically one-dimensionally curved connection contour between the profiled surfaces 32, 34 can be stamped. For the circulating belt 64 to be evenly stretched, the device 60b includes two compensation rollers 66a, 66b, whose shape is complementary to the pressure rollers 62c, 62d, that is approximately drum shaped.

Figure 8:
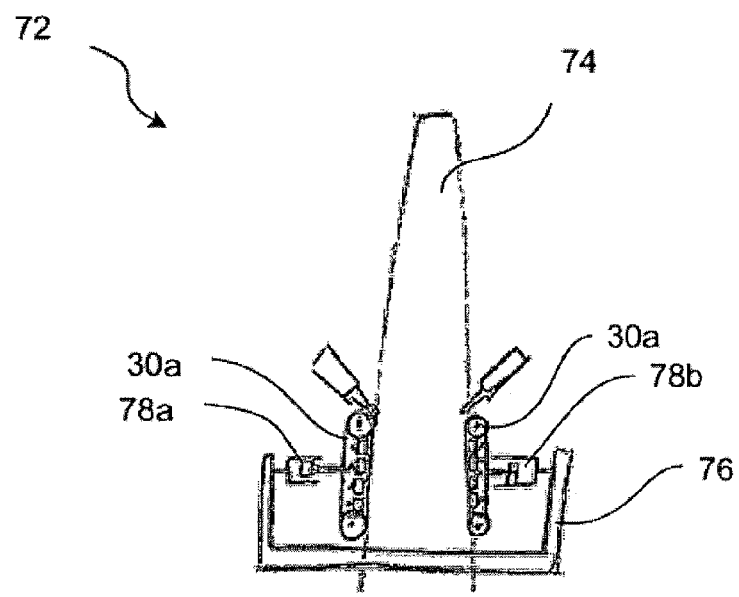
FIG. 8 shows a diagrammatic representation of an arrangement for a bilateral processing of a profiled surface.

In FIG. 8, an arrangement 72 for the simultaneous processing of two connection arrangements is represented, which are arranged on the two sides of a profiled section 74, for example, in order to attach a nose 18 (FIG. 2) simultaneously at the two connection ends to the profiled section 74. The arrangement 72 includes a frame 76 to which two of the devices 30a represented in FIG. 6—naturally alternatively it is also possible to use the alternative device 60b represented in FIG. 7—are attached via lifting devices 78a, 78b. Using the lifting devices 78a, 78b, the two devices 30a in each case are pressed against the profiled section 74 in the region of the two connection arrangements, the exerted forces mutually compensating each other in the process, and only a small effort is required for fastening the profiled section 74. As a result of the simultaneous processing on the two sides, the production time is reduced by approximately half.

LIST OF REFERENCE NUMERALS

10 Stern section of an aircraft
12 Horizontal stabilizer
14 Vertical stabilizer
16 Front edge region
18 Cap or nose
20 Suction pump
22 Suction holes
30a, b Connection arrangement
32 First profiled surface
34 Second profiled surface
36 First fixing strip
38 Bore holes
40 Second fixing strip
42 Bolts
44 Surface of 36
45 Filler region
46 Groove 48 Gap
50 Groove
52 Filling material
54 Undercut
55 Connecting surface
56 Separating film
58 Filling material
60a, b Device
62a-d Pressure rollers
64 Circulating belt
66a, b Compensation rollers
70 Injection device
72 Arrangement
74 Profiled section
76 Frame
78a, b Lifting devices

The invention claimed is:

1. A method of forming a connection arrangement that connects two profiled elements in a seamless and aerodynamically smooth manner, the connection arrangement forming a profiled surface around which laminar flow is possible, the method comprising:
   providing a first profiled element that has a first fixing strip with first bore holes with fixing bolts, the first fixing strip defining a surface;
   providing a second profiled element that has a second fixing strip arranged beneath the first fixing strip, the second fixing strip has second bore holes aligned with the first bore holes that receive the fixing bolts to rigidly connect the first profiled element to the second profiled element, the surface of the first fixing strip disposed lower than surfaces of the first profiled element and the second profiled element to define a filler region above the surface of the first fixing strip surface;
   partially filling the filler region with a first filling material layer, smoothing a surface of the first filling material in a longitudinal direction of the connection arrangement, and curing the first filling material layer; and
   completely filling the filler region with a second filling material layer, smoothing a surface of the second filling material layer in a shaping manner, and curing the second filling material layer to form the profiled surface that connects the surfaces of the first profiled element and the second profiled element.

2. The method according to claim 1, wherein one of the profiled elements is made of plastic and another of the profiled elements is made of metal.

3. The method according to claim 2, wherein the plastic is a carbon or glass reinforced plastic.

4. The method according to claim 2, wherein the metal is a titanium alloy.

5. The method according to claim 1, further comprising forming a connecting surface between the profiled elements using the second filling material, the connecting surface defining a step that has a height of one paint layer to be applied onto the connecting surface.

6. The method according to claim 5, further comprising applying the paint layer onto the connecting surface to form the profiled surface that connects the surfaces of the first profiled element and the second profiled element.

7. The method according to claim 1, further comprising forming an undercut in a region where the first profiled element transitions to the first fixing strip or the second profiled element transitions to the second fixing strip.

8. The method according to claim 1, further comprising laser cleaning the surface of the first fixing strip before partially filling the filler region with the first filling material.

9. The method according to claim 1, further comprising laser cleaning the first filling material layer before completely filling the filler region with the second filling material.

10. The method according to claim 1, wherein the smoothing of the second filling material layer uses a removal scraper moved in the longitudinal direction of the connection arrangement.

11. The method according to claim 1, wherein the smoothing of the second filling material layer uses a separating film applied temporarily onto the second filling material layer, and at least one pressure roller rolled over the separating film in the longitudinal direction of the connection arrangement.

* * * * *